UNITED STATES PATENT OFFICE.

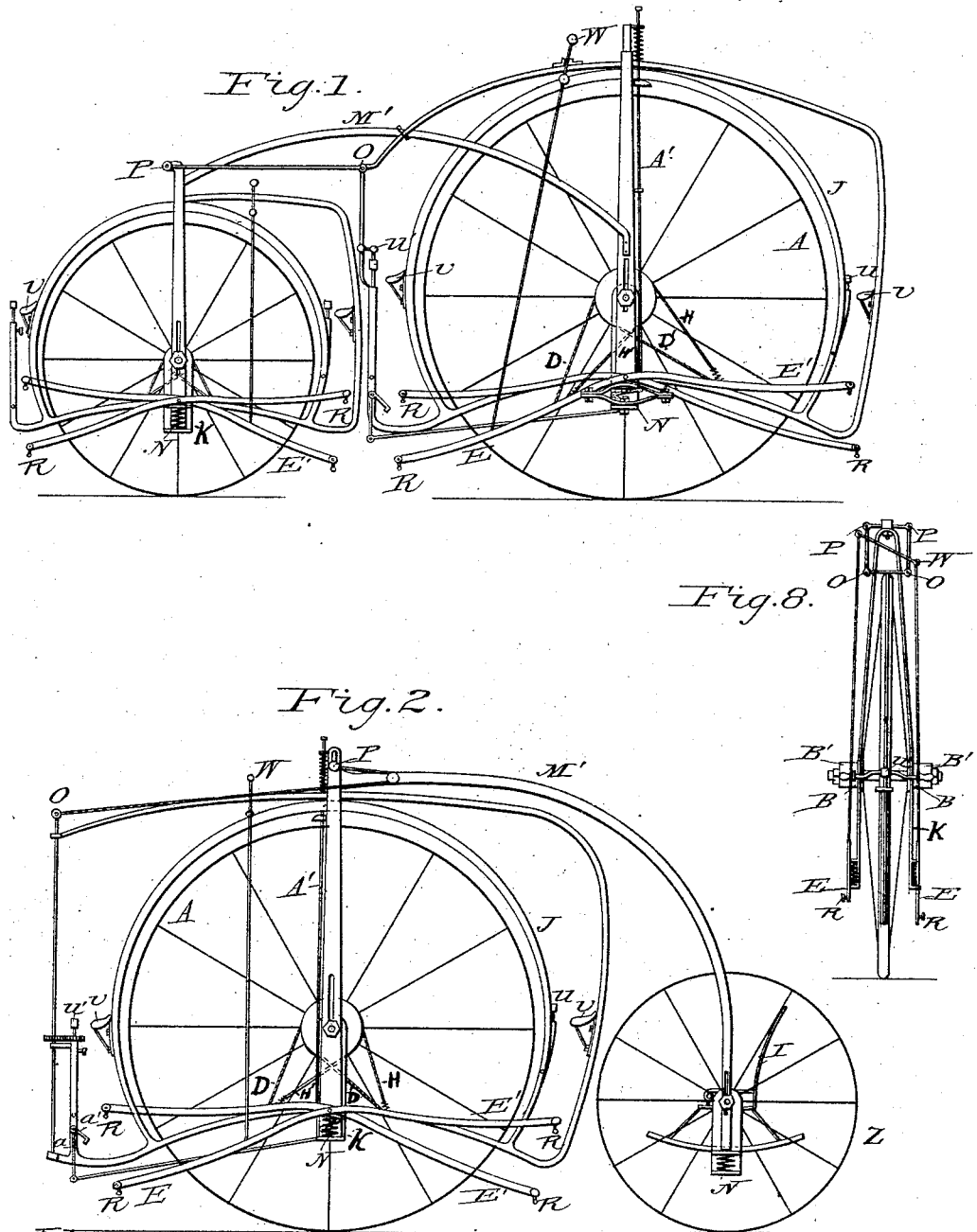

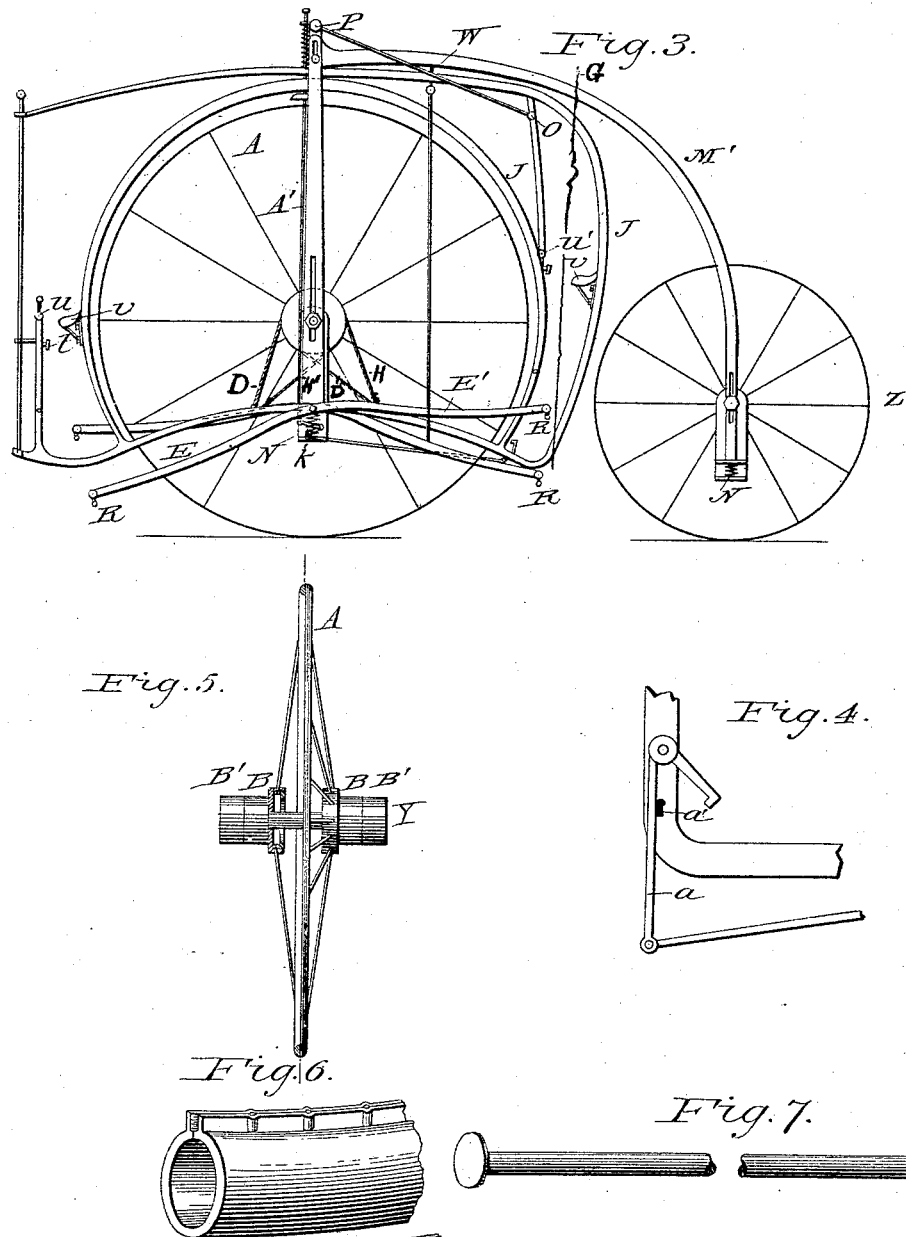

HOMER A. KING, OF SPRINGFIELD, MASSACHUSETTS.

VELOCIPEDE.

SPECIFICATION forming part of Letters Patent No. 327,954, dated October 6, 1885.

Application filed August 6, 1885. Serial No. 173,780. (No model.)

*To all whom it may concern:*

Be it known that I, HOMER A. KING, a citizen of the United States, residing at Springfield, in the county of Hampden and State of Massachusetts, have invented new and useful Improvements in Motor-Carriages, which improvements are fully set forth in the following specification and accompanying drawings.

My invention relates to improvements in motor-carriages; and the object of my improvements is to provide safe and convenient express, passenger, and pleasure motor-carriages, suited to ladies and gentlemen, easily and swiftly propelled by steam or electricity, or by one or more riders, each on an adjustable seat with an opening between the seat and handle-bar, extending down below foot-rests near the ground, with a seat in the rear or front of a driving-wheel, or both in the rear and front of a driving-wheel, instead of above the driving-wheel, as in other bicycles, thus avoiding danger and inconvenience, and making it possible to use a bicycle with one or both of the wheels of six or more feet in diameter, so constructed that every vehicle can be propelled by one or more ladies or gentlemen of any height of stature.

Referring to the drawings, Figure 1 is a side-elevation view of a bicycle made to carry one, two, three, or four persons, enabling each to assist, when he or she desires, to propel the carriage. Either the steering or the following wheel may be larger than the other, or both may be of the same diameter.

Fig. 1 is a view of a bicycle, steered by the rider in the front seat of the rear wheel, arranged with seats for from one to four riders; but it may be constructed very light, with only two seats, and the driving mechanism on only one wheel.

Fig. 2 is a side-elevation view of a tricycle with my improvements, propelled by one or more riders, and is adapted to carry one person in the rear of the front wheel, and also one person in front of the front wheel, while one or more persons can ride in a rocking chair or chairs between the two large following wheels when constructed as shown in the drawings. The steering-connection is shown with the front seat; but it may be steered from any seat. The rider or riders in the chair or chairs may propel or assist to propel the vehicle by rocking the chair.

Fig. 3 is a side-elevation view of a bicycle with my improvements adapted to carry only one or two riders, making a very light, safe, and convenient vehicle.

Fig. 4 is an enlarged view of the key-hole and operation of the lock to lock the brake down when the vehicle is left on the street.

Fig. 5 is a view of the hub, with flanges and openings to receive the spokes, and even without a cover or collar will hold the headed ends when the other ends are screwed into the felly; and a cover may be adjusted to the heads to prevent a loose spoke from coming out.

Fig. 6 is a view of a part of the metallic felly. It may be made of thin steel bent to form an endless cylinder, or slightly flattened on the sides to give greater strength to the felly, which is also strengthened by the two flanges meeting and brazed together, especially when the edges of the flanges are bent in so as to touch the felly inside just opposite the rubber tire when one is used. The outside of the felly may be made with ridges to receive the rubber tire, or nearly round, and rough, to be used without any tire, as with springs N and large wheels a rubber tire may not be necessary.

Fig. 7 is a view of the spoke, which has a head or flange at one end and a thread at the other end, and may be screwed in or taken out when injured and another screwed in by any person with a pincher or pipe-wrench.

Fig. 8 is a rear sectional view from between the perpendicular line G and the bar O of Fig. 3, showing the method of steering by the handle-bar in connection with the steering-bars O and P; and it also shows the springs N resting on the drop-axle K and supporting the fork and frame; also the connection W, connected with the levers E.

My improvements embraced in this specification are here described in connection with improvements described in my application for Letters Patent filed September 4, 1884, but may be used with almost any other propelling mechanism.

The rider on seat V operating the united or double levers E and E' and the connection W, the straps D and D', H and H', causes the driving mechanism to rotate the driving-wheel A forward and thus propel the vehicle. One seat V is attached to the front and another seat to the rear of the frame J, and a space is left in front of the seat, between the seat and the handle-bar, extending down below the foot-rests, to permit one limb of the rider to pass easily between the seat and the handle-bar, thus avoiding the danger and inconvenience, even for gentlemen, of mounting a high seat astride of the frame or backbone M', anticipating and often experiencing "a header;" while my low-seat improvements, with opening in front of the seat, also adapt the King bicycle for the use of ladies as well as for gentlemen. By having the seat below the backbone M' a large steering-wheel can be used, and much of the danger of tipping sidewise avoided, as a slight turn of a large steering-wheel supports a vehicle more quickly than can be done with a small steering-wheel, and with the rider or riders near the ground the weight is kept more easily over, or nearly over, the center of gravity without such excessive serpentine turning of the bicycle to the right and left, as with my improvements it may be run more nearly in a straight line. Most of my improvements can be used on a bicycle with a small steering-wheel in front of a driving-wheel, with the frame J near the ground and below the front seat, without backbone or frame above steering handle-bar.

In Figs. 2 and 3 the backbone is in the rear of a large steering-wheel, high enough to clear the frame over the head of the rider in the rear seat of the front wheel, for the reasons before stated, and because large wheels pass over holes and rough roads more easily and safely. Either the front or rear wheel may be made the driving-wheel, or both wheels may be driving-wheels, as in Fig. 1; but when a large driving-wheel is not desired the backbone M' may bend up more abruptly and yet high enough to clear the frame above a tall man's head, even if one or both wheels are not very large.

It is very important to have the seats and handle-bars made adjustable. This may be accomplished in various ways, but is indicated in only one way on the drawings—namely, by the set-screw or bolts securing the seat and handle-bar at any desired height above the treadles, thus rendering every vehicle "a fit" for any person of any height of stature, and therefore salable to any person desiring to purchase a bicycle.

The front fork and backbone M', with frame J, are supported by the springs N, and the upper part of the frame, as shown in the drawings, gives room some distance above the wheel A for the brake A', held up to the frame by a spring above, except when, by the foot acting on the eccentrics, it is pressed down on the wheel to retard the progress or stop the vehicle; and there is room also for the action of the frame above the wheel, as it moves up and down upon the spring N, to which it is attached, yet the frame is, with the seat V, not far removed from the front and rear of the wheel. The frame extended in the rear of each wheel incloses the seat, extending below, back of and above the rider, when constructed as shown in the drawings, and supporting him under the backbone M' from a point above the wheel and over the springs N, and the frame and extension of the handle-bar in front of each wheel also surrounds and supports the rider in front of each wheel.

The lock a' may be of any approved construction, and set in the frame back of the key-hole shown in Fig. 4. The shaft of the handle-bar U' extends nearly up to the backbone M', with a cross-bar, O, with its ends connected by rods, chains, cords, or otherwise to the steering-bar P at the head of the fork over the steering-wheel, when the vehicle is steered by moving the ends of the handle-bar U' back and forth, the same as in steering the common bicycle.

The backbone, at its end over the steering-wheel, is connected, as in most other bicycles, by a pivot in the steering-head over the fork, and the steering handle-bar U' may either rest upon and be joined to the frame of the following wheel, and thus be really connected with the backbone, as in Fig. 1; or the connections at their upper rear ends may be connected to the backbone, as shown in Fig. 3, or round a pulley, as shown in Fig. 2, as the steering principle, embracing three points, is the same in all three vehicles.

The tricycle, Fig. 2, may be used by persons crippled in the feet, the rider propelling the vehicle by his hands, moving the levers E and E' by other levers; or, by constructing a vehicle with the levers E and E' perpendicular, a valuable vehicle may be made for this class of sufferers.

One or two small wheels might be attached to the frame in front of the steering-wheel in a vehicle like Fig. 3; but they would seldom, if ever, be of any service if the heavier person ride in the rear seat. A bolt passes through a mortise in the fork into the end of axle K to hold the wheel within the fork; but the fork may be round or slightly flattened, and passed through a hole in the bolt after it is secured in the end of axle K.

Some of the improvements referred to in this specification, and shown in the accompanying drawings—namely, the connection W, the levers E and E', the straps D and D', H and H', the double-box driving mechanism, the springs N, and the rocking-chair I—are also described and claimed in the specification and shown in the drawings accompanying my application for Letters Patent filed September 4, 1884. I therefore do not claim such improvements in this application.

Having thus described my invention, what I claim as new, and desire to secure by Letters Patent, is—

1. A bicycle propelled by levers without the crank-motion, and with more than two seats for riders, a seat being in front of and a seat in the rear of a driving-wheel, in combination with treadles, levers, and connection to a driving mechanism to rotate a driving-wheel.

2. A bicycle propelled by levers without the crank-motion, and with seats for two riders, the seats being lower than the top of the largest wheel, and all so constructed that either or both riders may propel or assist to propel the vehicle.

3. A vehicle with a backbone of any suitable material connecting a steering-wheel and a following attachment, and with a seat on which a person can sit erect under or below the backbone, in combination with a driving mechanism for transmitting power to propel a driving-wheel.

4. A single-track bicycle propelled by levers without the crank-motion, and with two seats and a frame constructed to support each seat, and also support a handle-bar in front of each seat, and yet leave between each seat and handle-bar an open space extending down near the foot-rests, to permit one limb of a rider to pass easily between the seat and the handle-bar, substantially as set forth.

5. A bicycle having under or below the backbone an adjustable seat which may be moved up or down and secured at the proper height above the treadles to suit the limbs of a rider of any stature, in combination with an adjustable handle-bar and connection with a driving mechanism to rotate a driving-wheel.

6. A steering-bar, P, for steering a vehicle, in combination with the fork of a steering-wheel and with connection to a following attachment, and to a steering-handle and a seat, both seat and steering-handle being under or below the backbone.

7. A frame partly inclosing a driving-wheel of a vehicle, in combination with springs N and seat V, treadles, levers, and connection to a driving mechanism, substantially as and for the purposes set forth.

8. A seat in the rear of and lower than the top of the driving-wheel of a bicycle, the seat being supported by an extension of the frame of the driving-wheel entirely surrounding the rider, extending down in front below the seat and up back of and above the head of the rider in the seat, in combination with treadles, levers, and connection to a driving mechanism to rotate a driving-wheel.

9. A seat in front of and lower than the top of a driving-wheel of a bicycle, the seat being supported by an extension of the frame of the driving-wheel entirely surrounding the rider, extending down in front below the seat and up back of and above the head of the rider in the seat, in combination with treadles, levers, and connection to a driving mechanism to rotate a driving-wheel.

HOMER A. KING.

Witnesses:
S. MINOT CRANE,
ADDIE F. CRANE.